United States Patent [19]

Signoret

[11] Patent Number: 4,665,715
[45] Date of Patent: May 19, 1987

[54] METHOD OF AIR CONDITIONING AND AIR-CONDITIONER FOR CARRYING OUT THE SAME

[75] Inventor: Jacques Signoret, Toulouse, France

[73] Assignee: ABG Semca, Paris, France

[21] Appl. No.: 819,025

[22] Filed: Jan. 15, 1986

[30] Foreign Application Priority Data

Jan. 18, 1985 [FR] France .............................. 85 00740

[51] Int. Cl.⁴ .............................................. F25D 9/00
[52] U.S. Cl. ...................................................... 62/402
[58] Field of Search .................................. 62/86, 402

[56] References Cited

U.S. PATENT DOCUMENTS

| 2,585,570 | 2/1952 | Messinger et al. | |
| 3,083,546 | 4/1963 | Turek | 62/86 X |
| 3,619,987 | 11/1971 | Colvin et al. | |
| 4,374,469 | 2/1983 | Rannenberg | 62/402 |
| 4,503,683 | 3/1985 | Wieland et al. | 62/86 |

FOREIGN PATENT DOCUMENTS

| 0035909 | 9/1981 | European Pat. Off. . |
| 864531 | 4/1941 | France . |
| 1115735 | 4/1956 | France . |
| 2148441 | 3/1973 | France . |
| 2234041 | 1/1975 | France . |
| 2278043 | 6/1976 | France . |
| 2486210 | 8/1982 | France . |
| 2532408 | 3/1984 | France . |

Primary Examiner—Lloyd L. King
Attorney, Agent, or Firm—Oblon, Fisher, Spivak, McClelland & Maier

[57] ABSTRACT

A conditioning method and an air-conditioner for carrying out such method which comprises, in a compression, cooling and expansion cycle, a drying operation performed prior to the expansion. According to the invention, a dryer is alternately operated in an adsorption phase and a regeneration phase, depending on whether it communicates with the outlet or the inlet of a heat exchanger. The present method and device can be advantageously applied to environment control in the field of aircraft and automotive vehicle air conditioning.

9 Claims, 5 Drawing Figures

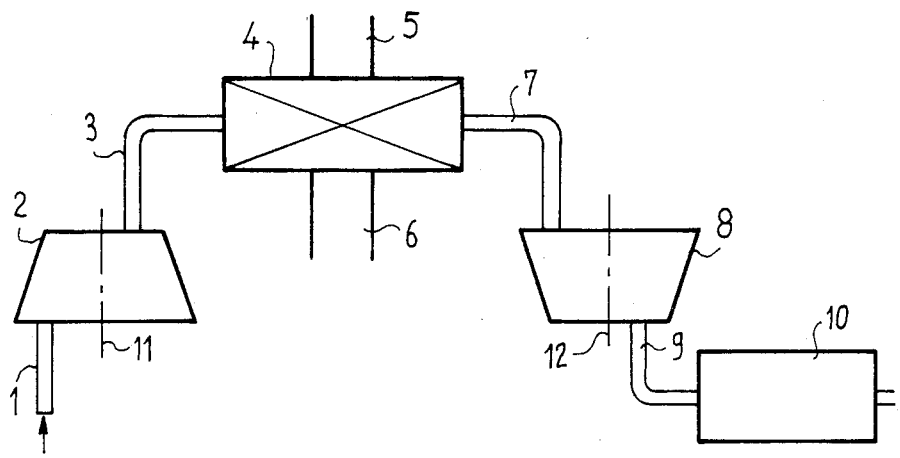
FIG_1 PRIOR ART
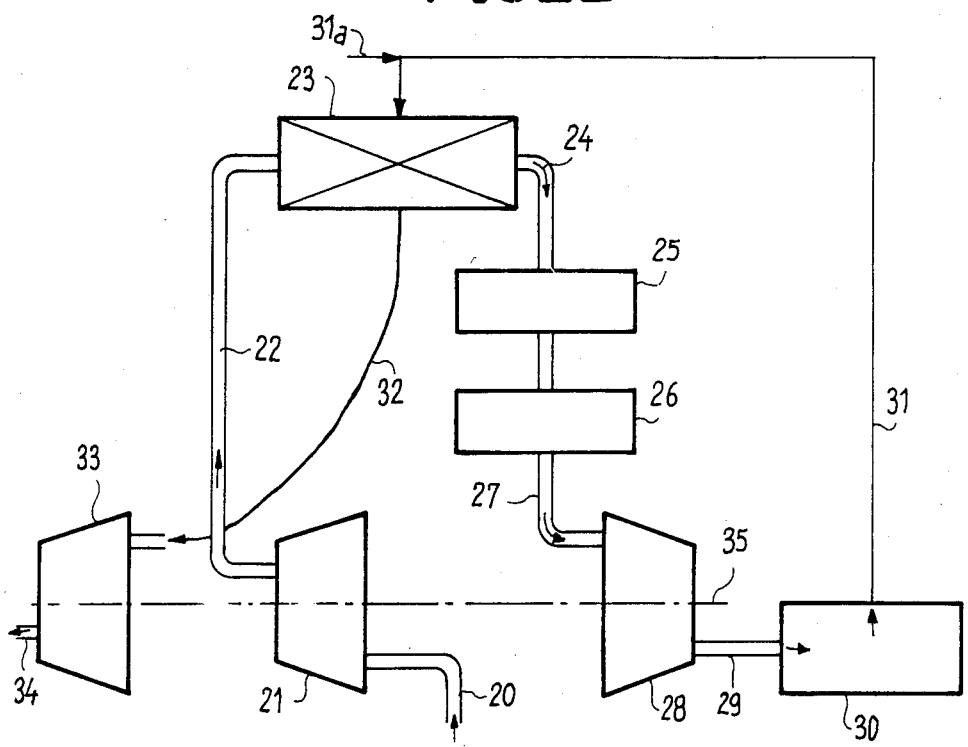
FIG_2

FIG_3
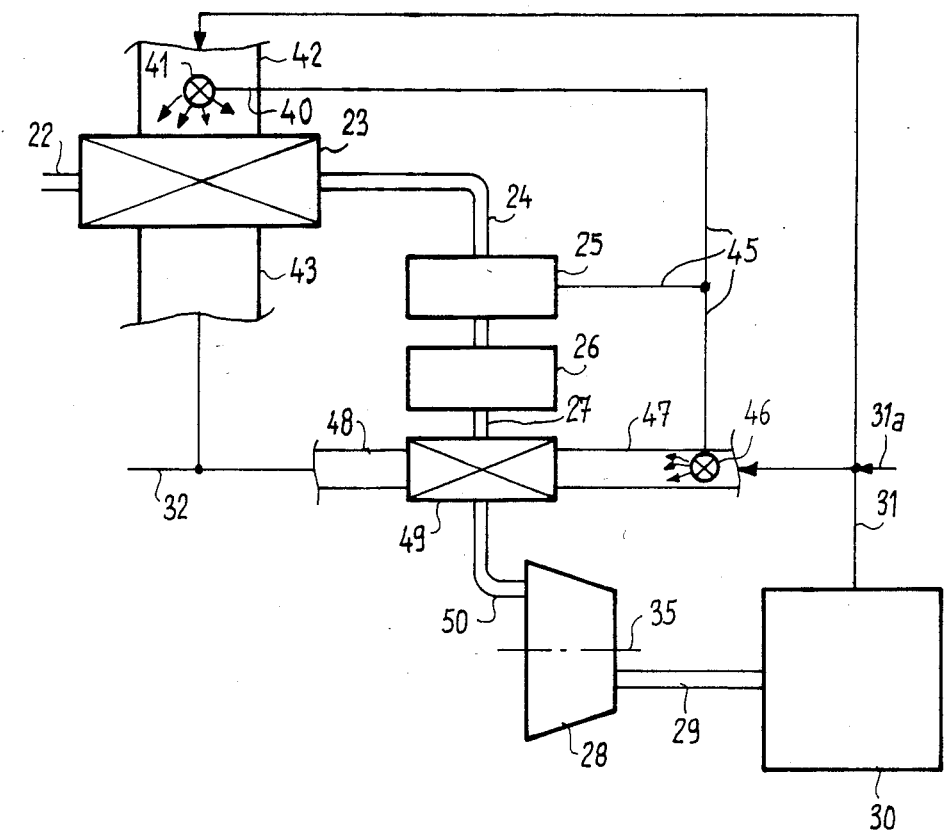
FIG_4
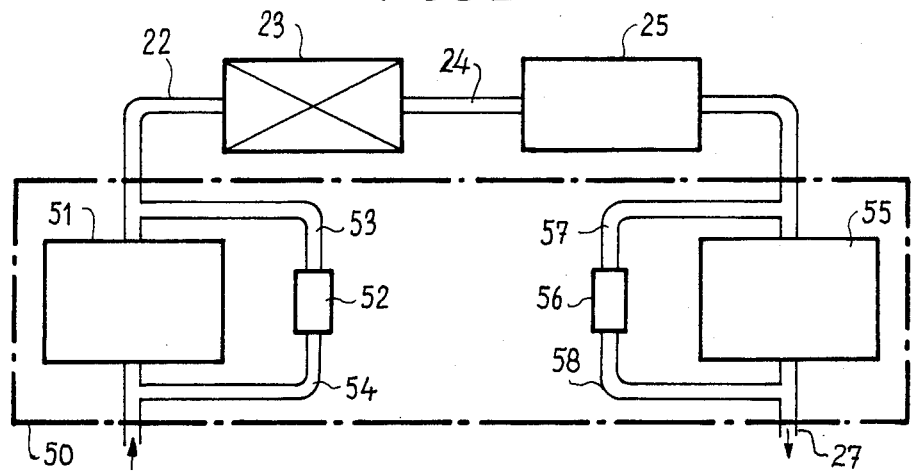

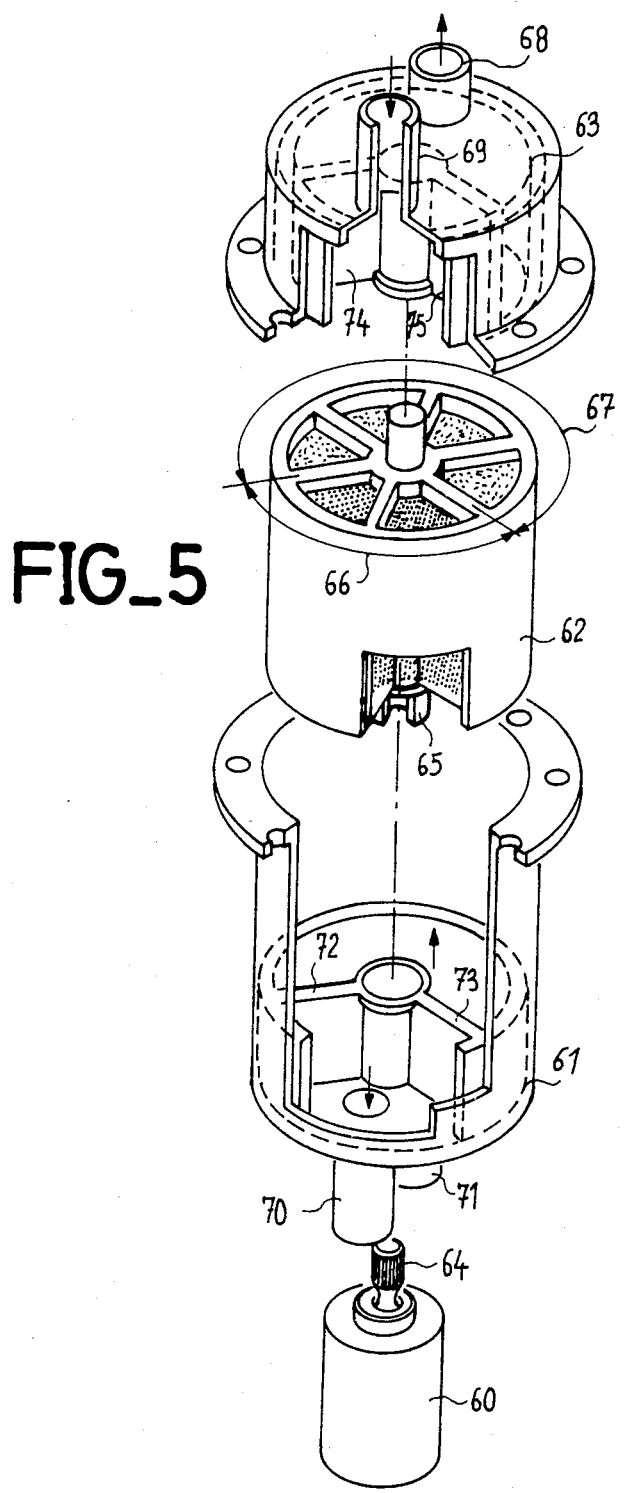
FIG_5

METHOD OF AIR CONDITIONING AND AIR-CONDITIONER FOR CARRYING OUT THE SAME

BACKGROUND OF THE INVENTION

1. Field of the Invention

The present invention concerns an air conditioning method, as well as an air-conditioning device for carrying out said method. It can be applied in controlling the environment especially in relation to aeronautical or vehicle air-conditioning.

2. Description of the Prior Art

According to the prior art, it is known to produce air-conditioners that comprise a compressor which draws in air from the outside atmosphere so that it can be discharged upon a exchanger that is adapted to lower its temperature while retaining its pressure to within an insignificant drop in value. The atmospheric air cooled in this way undergoes a further cooling through expansion in a turbine wheel which discharges into an enclosure to be air-conditioned. This succession of thermodynamic operations results in the formation of liquid water, produced by condensation of water vapor contained in the air at the inlet of the compressor. The inlet valves of the conditioned enclosure can thus be blocked by frost.

In order to overcome this drawback, the prior art has already proposed to utilize a water extractor placed between the exchanger and the expansion turbine or between the expansion turbine and the enclosure to be conditioned. Other systems combine both these arrangements. However, the extraction technique consists of collecting the liquid water within the exchanger only once.

SUMMARY OF THE INVENTION

The invention is a considerable improvement over the techniques based upon water extraction described above.

In fact, the present invention concerns a method for conditioning the air within an enclosure, which method comprises the steps of compressing the outside atmospheric air, cooling it in an exchanger, and then expanding it. According to the invention, the method further comprises the step of drying the atmospheric air issuing from the exchanger prior to the step of expanding the air, so as to limit the amount of humid vapor in the expanded atmospheric.

The present invention also concerns an air-conditioner for carrying out the method according to the invention. This type of air-conditioner comprises at least one compressor, at least one heat exchanger, at least one expansion turbine, and a drying device between the outlet of the exchanger and the inlet of the expansion turbine.

BRIEF DESCRIPTION OF THE DRAWINGS

Other features, objects and advantages of the present invention will become apparent from reading the following description given with reference to the appended figures in which:

FIG. 1 is general diagram of an air-conditioner according to the prior art;

FIG. 2 is a block diagram of a first embodiment of an air-conditioner according to the invention;

FIG. 3 is a diagram of a part of the air-conditioner according to a second embodiment of the invention;

FIG. 4 is a diagram of part of an air-conditioner according to a third embodiment of the invention;

FIG. 5 is an exploded perspective view of a particular embodiment of a component of an air-conditioner according to the invention.

DETAILED DESCRIPTION OF THE DRAWINGS

The Prior Art

FIG. 1 represents an air-conditioner according to the prior art. The outside atmosphere, such as, for example, atmospheric air, enters a compressor 2 through an inlet duct 1. The compressor 2 comprises a driven shaft 11 that raises the pressure and the temperature of air sucked into the compressor 2. The outlet of the compressor 2 is connected to the inlet of an exchanger 4 by a conduit 30. The exchanger 4 receives a cooling agent or refrigerating fluid that eliminates the calories carried by the inlet flow. The cooling agent is transmitted from an inlet pipe 5 to an outlet pipe 6. The exchanger 4 is connected to an expansion turbine 8 by a conduit 7. The expansion turbine 8 has a driving shaft 12 which can be the same as that of the compressor 2. The output of the expansion turbine 8 is connected through a water separating device (not represented) in a conduit 9 to an enclosure 10 to be air-conditioned.

The First Embodiment

FIG. 2 represents a first embodiment of the invention. As shown in the diagram, a first compressor 21 draws in through a conduit 20 the outside air or previously compressed air and delivers it through a duct 22 to an exchanger 23. The air which has been previously compressed and then cooled in the exchanger 23 is delivered through a conduit 24 to a water extractor 25 that removes the condensation water in liquid phase issuing from the exchanger 23. The air passes thereafter through a dryer 26 that absorbs the water not extracted in liquid phase, as well as part of the water in vapor phase. A dryer suitable for use in the present invention can be of the molecular sieve type. The outlet of the dryer 26 is connected to the inlet of an expansion turbine 28 by a conduit 27. The output of the expansion turbine 28 is connected to an enclosure 30 to be air-conditioned by a conduit 29. The circulation of the cooling agent through the exchanger 23 can be ensured through a fan 33 or a pump that may be mounted upon a shaft 35 that also powers the first compressor 21 and the expansion turbine 28. In the first embodiment according to the invention, the fan 33 draws in the stale air in the enclosure 30 so as to thereafter discard it towards the outside. For this purpose, the inlet duct of the fan 33 is connected to an outlet duct of the enclosure 30 by a conduit 31. The conduit 31 acts, after mixing with the outside air introduced through a conduit 31a, to cool the exchanger 23. The duct 31 is, in fact, connected to the cooling inlet of the exchanger 23, and a conduit 32 connects the exchanger 23 to the inlet of the fan 33. The fan 33 rejects the stale air through a conduit 34. The three units 21, 28, and 33 are all actuated by the shaft 35. It will be noted that the enthalpy at the outlet of the exchanger 23 is considerably reduced without supplementary loss in the cycle. It will furthermore be noted that the dryer 26 and the exchanger 23 provide a high enthalpy gain per unit of pumped air with respect to the conventional pattern, while decreasing the water vapor content. This difference of enthalpy is evacuated in the outside air by the exchanger 23. The supplementary pressure drop at the inlet of the expansion turbine 28 is compensated according to the invention by the suppression of the loss due to the water separating device, which, in conventional practice, is disposed at a downstream location.

According to the prior art, the water separating device was generally disposed between the expansion turbine 8 and the enclosure 10 of FIG. 1. It avoided the rapid formation of frost at the inlet of the enclosure to be air-conditioned. It will thus be noted that the outlet enthalpy is lower and that the cooling power has been increased. For a given cooling power, the enthalpy drop at the turbine can be decreased through reduction of the mechanical power supplied to the system.

The Second Embodiment

FIG. 3 represents a second embodiment of the invention. Parts that are the same as in the first embodiment are designated by the same parts number and will not be described further.

In this variant, condensation liquid can be withdrawn from the water extractor 25 through ducts 45 and projected by spray nozzles 41, 46 into inlet pipes 42 or 47 of the exchanger 23 and an exchanger 49, respectively. At the exchanger 23, the spray nozzle 41 extracts the calories from the air flow entering that exchanger. In the installation according to the invention represented in FIG. 3, the second exchanger 49 has been added at the outlet of the dryer 26.

The cooling inlets of the two exchangers 23 and 49 (i.e., the inlet pipes 42 and 47) are both connected to the conduit 31 wherein the stale air of the enclosure 30 and the outside air supplied by the conduit 31a are mixed. Furthermore, outlets 43, 48 of these two exchangers are both connected to the conduit 32 leading towards the exhaust-fan. The cooling fan fluid flows passing through the exchangers thus follow two parallel paths.

The invention allows the extraction of the water contained in the atmosphere blown into the enclosure according to a method different from that of the prior art and thereby obtains considerably improved performances.

One criterium of the performance is the requirement that, under equal conditions of pressure, temperature, and flow-rate of the exchangers 4 or 23, the enthalpy of the water-air mixture contained in the atmosphere blown into the enclosure should be as low as possible in order to allow at a given temperature the highest possible amount of heat to be attracted from the enclosure.

The evolution of the pressure and enthalpy values in a standard case is indicated in the table herein-below. The table allows one to compare this evolution for a certain number of parameters concerning the elements of FIG. 1 for the prior art and of FIG. 3 for the invention. The reference numerals of these elements are indicated.

In the table represented herein-below, mb denotes millibar as a fractional pressure unit, g/kg denotes grams of water vapor per kilogram of humid air as a measurement of the water vapor content, KJ/kg denotes kilojoules per kilogram as the unit of enthalpy, and °C. denotes the unit of temperature.

| Parameters | Ref. | Prior art device | Ref. | Invention |
| --- | --- | --- | --- | --- |
| turbine inlet pressure | 8 | 4 000 mb | 28 | 3 800 mb |
| turbine inlet temperature | 8 | 48° C. | 28 | 48° C. |
| water vapor content at inlet of | 8 | 18 g/kg | 28 | 6 g/kg |
| turbine inlet enthalpy | 8 | 93 KJ/kg | 28 | 64 KJ/kg |
| turbine outlet pressure | 8 | 1 150 mb | 28 | 1 050 mb |
| enthalpy drop in the zone | 8 | 77 KJ/kg | 28 | 79 KJ/kg |
| enclosure inlet enthalpy | 10 | 16 KJ/kg | 30 | −15 KJ/kg |
| enclosure outlet enthalpy | 10 | 39 KJ/kg | 30 | 39 KJ/kg |
| cooling power | | 23 KJ/kg | | 54 KJ/kg |

For a given energy consumption, the refrigerating power (or capacity) is doubled through utilization of the method of the present invention.

The Third Embodiment

One particular problem encountered when using a dryer arises from the fact that the operation of the dryer is based on adsorption. It is therefore necessary periodically to regenerate the dryer while taking into consideration the characteristics of the material being dried. The regenerating of a molecular sieve type dryer, for example, is carried out in most cases by heating. In order to achieve this function, different means (such as a heating coil) are envisaged in the prior art in the field of drying processes. In order not to reduce the energetic balance, the present invention provides a particularly advantageous arrangement such as is represented in FIG. 4. According to this embodiment, the dryer is constituted by a drying system 50 comprising two dryer portions 51 and 55. The drying system 50 is interposed between the exchanger 23 and the compressor, on the one hand, and between the exchanger 23 and the expansion turbine, on the other hand. The dryer portion 51 in the regeneration phase is connected to duct 22 leading to the exchanger 23. In fact, the dryer portion 55 that is connected to the outlet of the exchanger, is crossed through by an atmospheric air stream that is colder that the atmospheric air heated by compression, which flows through the dryer portion 51 in the regeneration phase. It will be understood that the humidity due to adsorption in the dryer portion 51 will be evaporated. The evaporated water added to the humidity of the air to be cooled is thereafter condensed in the exchanger 23 and extracted by means of the water extractor 25. It is thus possible to regenerate the dryer 51 while the dryer portion 55 operates in adsorption conditions, and then to invert the respective functions of the two dryer portions.

FIG. 4 also represents means for preventing frosting up of the dryer portions 51 and 55. In order to perform this de-frosting, valves 52, 56 are provided connecting conduits 53, 54 and 57, 58, respectively. Actuation of the valve 52, 56 reinjects periodically, or upon the order of an operator, the outlet air stream of a dryer portion.

THE PREFERRED DRYING DEVICE

FIG. 5 represents an embodiment of a drying device according to FIG. 4. The device comprises a motor 60 adapted to actuate a drum 62 containing the dryer. The drum 62 is contained within a tank 61. The tank 61 is closed by means of a cap 63 that comprises two tubular necks 68 and 69 axially aligned with tubular necks 70 and 71 on the tank 61. The tubular neck 71 communicates with the first compressor 21, while the tubular neck 70 supplies a stream of dried atmospheric air to the exchanger 49. During the inlet flow phase through the tubular neck 71, the atmospheric air stream meets a portion 67 f the dryer which is operating in the regeneration phase while this stream is directed towards the inlet of the exchanger 23 through the tubular neck 68. The outlet of the exchanger 23 is connected to the tubular neck 69 that supplies a flow of atmospheric air a portion 66 of the dryer operating in the adsorption phase. The outlet of the dryer portion in the adsorption phase communicates with the tubular neck 70 of the drying device.

The tank 61 and the cap 63 of the tank 61 comprise walls 72 to 75 that isolate the atmospheric air streams flowing through the dryer. In one preferred embodiment, the drum 62 comprises six segments or sector that are angularly distributed over 360°. At least two of these segments are associated at all times with the portion 67 operating in the regeneration phase. The walls 72 and 73 of the bottom of the tank 61 are thus mutually shifted and separated by 120°, in front of the portion operating in the adsorption phase, while the walls 74 and 75 of the cap 63 repeat this arrangement above the portion operating in the adsorption phase.

According to a variant (nor represented in the figures), an extractor of condensation liquid is associated with the output of the exchanger 49. The collected liquid, such as water (in the normal case of conditioning atmospheric air), is drawn off and sent back into the ducts 45.

In one variant, the dryer is enclosed in two fixed containers and the commutation from the drying phase to the regeneration phase is carried out through a set of valves causing each container to function alternately in either one of the two phases. The possibility is thus available of operating in the adsorption or the regeneration phase. The regeneration can be performed through utilization of hot air provided by the circuit described herein-above, or of hot air or any other suitable fluid flow issuing from a regenerating device.

It will be noted that, similar to the embodiment represented in FIG. 5, the duration of the regeneration operation can be longer than that of the adsorption operation, depending on the working conditions. The motorization thus allows each section of the drum to be brought successively into a regeneration zone, while other sections work in adsorption in the complementary adsorption zone, the tank and cap assembly creating through the walls 72, 75 this division into two zones. According to one embodiment, this division can be controlled during operation when the two pairs of walls are hingedly mounted in a convenient manner.

The invention is not limited to the embodiments shown and described herein-above many modifications and variants may be envisaged by those skilled in the art without departing from the spirit and scope of the invention as defined in the appended claims.

I claim:
1. An air-conditioner comprising:
   (a) a compressor;
   (b) a first dryer;
   (c) a first conduit for delivering air from said compressor to said first dryer;
   (d) a first exchanger;
   (e) a second conduit for delivering air from said first dryer to said first exchanger;
   (f) a third conduit leading from said first conduit to said second conduit around said first dryer;
   (g) a first valve located in said third conduit;
   (h) a water extractor that removes the condensation water in liquid phase issuing from said first exchanger;
   (i) a fourth conduit for delivering air from said first exchanger to said water extractor;
   (j) a second dryer that absorbs the water not extracted in liquid phase by said water extractor and water in vapor phase;
   (k) a fifth conduit for dlivering air from said water extractor to said second dryer;
   (l) an expansion turbine;
   (m) a sixth conduit for delivering air from said second dryer to said expansion turbine;
   (n) a seventh conduit leading from said fifth conduit to said sixth conduit around said second dryer;
   (o) a second valve located in said seventh conduit;
   (p) a fan;
   (q) a shaft on which said compressor, said expansion turbine, and said fan are all commonly mounted;
   (r) an eighth conduit for delivering air from said expansion turbine to an enclosure to be air-conditioned;
   (s) a ninth conduit for delivering stale air from the enclosure to be air-conditioned to said first exchanger;
   (t) a tenth conduit for delivering air from said first exchanger to said fan; and
   (u) an eleventh conduit for delivering air from said fan to the external environment,
   whereby, in use, one of said first and second dryers is operated in a regeneration phase while the other one of said first and second dryers is operated in an adsorption phase.

2. An air-conditioner as recited in claim 1 and further comprising a twelfth conduit for delivering external air to said compressor.

3. An air-conditioner as recited in claim 1 and further comprising a thirteenth conduit for introducing outside air into said ninth conduit.

4. An air-conditioner as recited in claim 1 and further comprising:
   (a) a second exchanger located in said sixth conduit;
   (b) a fourteenth conduit for delivering air from the enclosure to be air-conditioned to said second exchanger; and
   (c) a fifteenth conduit for delivering air from said second exchanger to said fan.

5. An air-conditioner as recited in claim 4 and further comprising:
   (a) a first spray nozzle located in said ninth conduit;
   (b) a second spray nozzle located in said fourteenth conduit;
   (c) a sixteenth conduit for delivering condensation liquid from said water extractor to said first spray nozzle; and
   (d) a seventeenth conduit for delivering condensation liquid from said water extractor to said second spray nozzle.

6. An air-conditioner as recited in claim 1 and further comprising:
   (a) a first spray nozzle located in said ninth conduit and (b) a sixteenth conduit for delivering condensation liquid from said water extractor to said first spray nozzle.

7. An air-conditioner as recited in claim 1 wherein each one of said first and second dryers comprises a drum which is movable about an axis and which comprises cyclically disposed sectors adapted to operate successively in the adsorption phase and in the regeneration phase.

8. An air-conditioner as recited in claim 7 wherein:
(a) said drum is disposed in a space delimited by a tank and a cap;
(b) said drum is adapted to rotate within said space so as to present cyclically each one of said sectors in a regeneration zone and in an adsorption zone; and
(c) said regeneration zone and said adsorption zone are delimited by walls and are adapted to communicate with associated ones of said conduits.

9. An air-conditioner as recited in claim 8 wherein said drum is connected by connecting means extending through said tank to driving motor means adapted to successively move each sector of said drum into said regeneration zone.

* * * * *